United States Patent
Chan (12) United States Patent (10) Patent No.: US 12,203,651 B2
(45) Date of Patent: Jan. 21, 2025

(54) APPARATUS FOR TREATING GASEOUS POLLUTANT WITH PLASMA

(71) Applicant: BHT SERVICES PTE. LTD., Singapore (SG)

(72) Inventor: Chee Wei Chan, Kallang (SG)

(73) Assignee: BHT SERVICES PTE. LTD., Singapore (SG)

( * ) Notice: Subject to any disclaimer, the term of this patent is extended or adjusted under 35 U.S.C. 154(b) by 471 days.

(21) Appl. No.: 17/774,712

(22) PCT Filed: Nov. 7, 2019

(86) PCT No.: PCT/SG2019/050545
§ 371 (c)(1),
(2) Date: May 5, 2022

(87) PCT Pub. No.: WO2021/091477
PCT Pub. Date: May 14, 2021

(65) Prior Publication Data
US 2023/0003380 A1   Jan. 5, 2023

(51) Int. Cl.
*F23G 7/06* (2006.01)
*H05H 1/30* (2006.01)
*H05H 1/46* (2006.01)

(52) U.S. Cl.
CPC .............. *F23G 7/063* (2013.01); *H05H 1/30* (2013.01); *H05H 1/4622* (2021.05);
(Continued)

(58) Field of Classification Search
CPC .............. F23G 7/063; F23G 2204/201; F23G 2204/203; F23G 2209/14; H05H 1/30; H05H 1/4622; H05H 2245/10; H01P 7/06
See application file for complete search history.

(56) References Cited

U.S. PATENT DOCUMENTS

| 6,224,836 B1 * | 5/2001 | Moisan | H05H 1/46 422/186 |
| 6,298,806 B1 * | 10/2001 | Moisan | H05H 1/46 118/723 MP |

(Continued)

FOREIGN PATENT DOCUMENTS

| CN | 101852444 A | 10/2010 |
| CN | 102656953 A | 9/2012 |

(Continued)

*Primary Examiner* — David J Laux
(74) *Attorney, Agent, or Firm* — MUNCY, GEISSLER, OLDS & LOWE, P.C.

(57) ABSTRACT

An apparatus for treating gaseous pollutant with plasma comprises a microwave source generating a microwave oscillation; a waveguide component coupled to the microwave source; and a resonant cavity coupled to the waveguide component, the microwave oscillation is substantially propagated toward a waveguide direction, the resonant cavity comprises a first chamber and a second chamber, the waveguide direction is substantially parallel to a reference axis defined in the first chamber, the first chamber has an inner wall surrounding the reference axis, the inner wall comprises a first inner wall obliquely inclined toward the reference axis and a second inner wall substantially parallel in respect to the reference axis relatively, an area of the first inner wall is larger than that of the second inner wall so that the first chamber has a tapered space, and the microwave oscillation interacts with an ignition gas in the second chamber to generate a torch.

14 Claims, 12 Drawing Sheets

(52) U.S. Cl.
CPC .. *F23G 2204/201* (2013.01); *F23G 2204/203* (2013.01); *F23G 2209/14* (2013.01); *H05H 2245/10* (2021.05)

(56) References Cited

U.S. PATENT DOCUMENTS

| | | | |
|---|---|---|---|
| 6,340,863 | B1 | 1/2002 | Ikeda et al. |
| 9,277,636 | B2 | 3/2016 | Voronin et al. |
| 9,346,005 | B2 | 5/2016 | Voronin et al. |
| 9,371,581 | B2 | 6/2016 | Clements et al. |
| 9,512,518 | B2 | 12/2016 | Voronin et al. |
| 9,681,529 | B1 * | 6/2017 | Kuo .................. H05H 1/46 |
| 9,937,467 | B2 | 4/2018 | Kaneshiro et al. |
| 10,064,262 | B2 | 8/2018 | Voronin et al. |
| 2009/0183684 | A1 * | 7/2009 | Radoiu ............. C23C 16/4412 118/726 |
| 2009/0301298 | A1 | 12/2009 | Seeley |
| 2010/0074821 | A1 | 3/2010 | Grant |
| 2010/0290966 | A1 | 11/2010 | Seeley |
| 2017/0095787 | A1 * | 4/2017 | Hong ................... B01J 19/088 |
| 2017/0263410 | A1 * | 9/2017 | Fallahi ................ H05H 15/00 |
| 2018/0071751 | A1 | 3/2018 | Voronin et al. |

FOREIGN PATENT DOCUMENTS

| | | |
|---|---|---|
| CN | 103657370 A | 3/2014 |
| CN | 107087339 A | 8/2017 |
| TW | 201446080 A | 12/2014 |

\* cited by examiner

ID OF THE INVENTION

The invention relates to an apparatus for treating gaseous pollutant, and more particularly to an apparatus for treating gaseous pollutant with plasma.

BACKGROUND OF THE INVENTION

Exhaust gas in the semiconductor manufacturing process contains a variety of chemical substances harmful to the human body or the environment, for example, the most concerned perfluorocompounds (PFCs), such as $CF_4$, $C_2F_6$, $C_3F_8$, etc. Typical exhaust management system comprise combustion treatment system, plasma treatment system, thermal treatment system, wet-scrubber and catalyst treatment system, because the temperature at which perfluorocompounds decompose is relatively high, the combustion and plasma treatment system are preferably adopted. Among them, the plasma treatment system is well-developed technology, and the temperature generated by a plasma torch is relatively high, which is more suitable for decomposing perfluorocompounds, so the plasma treatment system has received much attention in recent years.

According to the source of plasma, the torch generated by the exhaust gas treatment apparatus includes direct current plasma torch and microwave plasma torch, which can be found in U.S. Patent Publication No. 20180071751A1, U.S. Pat. Nos. 9,937,467, 9,346,005, 9,371,581, 10,064,262, 9,512,518, 9,277,636, U.S. Patent Publication No. 20100074821A1, U.S. Patent Publication No. 20100290966A1 and U.S. Patent Publication No. 20090301298A1.

However, the major drawback of the existing technology is that it requires a large amount of electricity and fuel consumption. Therefore, it is difficult to reduce the cost of using the plasma torch to treat waste gas to a reasonable range.

SUMMARY OF THE INVENTION

A main object of the invention is to solve the problem that the conventional plasma torch for treating waste gas requires too much electrical power as well as fuel consumption.

In order to achieve the above object, the invention provides an apparatus for treating gaseous pollutant with plasma comprising: a microwave source generating a microwave oscillation; a waveguide component coupled to the microwave source to transmit the microwave oscillation; and a resonant cavity coupled to the waveguide component such that the microwave oscillation is substantially transmitted in the resonant cavity along a waveguide direction, the resonant cavity comprising a first chamber in proximity to the waveguide component and a second chamber distant from the waveguide component, the first chamber comprising an inlet end connected to the waveguide component and an outlet end distant from the waveguide component, the second chamber comprising a communicating end communicated with the outlet end and a closed end away from the communicating end, the second chamber be configured to receive the microwave oscillation passing through the first chamber, the microwave oscillation interacting with an ignition gas in the second chamber to form a torch; wherein, the waveguide direction is substantially parallel to a reference axis defined in the first chamber, the first chamber has an inner wall surrounding the reference axis and extending along the reference axis, the inner wall comprises a first region inclined toward the reference axis and a second region substantially parallel in respect to the reference axis, an area of the first region is larger than that of the second region so that the first chamber forms a reducing tapered space from the inlet end to the outlet end.

In one embodiment, the inner wall comprises a first inner side wall and a second inner side wall opposite to the first inner side wall, and the first inner side wall and the second inner side wall incline inwardly toward the reference axis from the inlet end to the outlet end.

In one embodiment, the inner wall has a first inner side wall and a second inner side wall opposite to the first inner side wall, and a gradual width difference between the first inner side wall and the second inner side wall is decreasing along the reference axis.

In one embodiment, the inner wall of the first chamber has a first top wall and a first bottom wall, the second chamber has a second top wall and a second bottom wall, and there is a first difference in height between the second top wall and the first top wall.

In one embodiment, the inner wall of the first chamber has a first top wall and a first bottom wall, the second chamber has a second top wall and a second bottom wall, and there is a second difference in height between and the first bottom wall.

In one embodiment, further comprising an ignition source and a dielectric tube, the dielectric tube is inserted in the second chamber and having a first end in proximity to the ignition source and a second end distant from the ignition source, the second chamber having a second top wall and a second bottom wall, the second end of the dielectric tube protrudes from the second chamber and there is a third difference in height between the second end of the dielectric tube and the second bottom wall of the second chamber.

In one embodiment, further comprising an ignition source and a dielectric tube, the dielectric tube is inserted in the second chamber, the ignition source comprising a probe component, the probe component comprising a support member and at least one tip disposed on the support member, and the tip having an outer diameter between 1.6 mm and 2 mm.

In one embodiment, the ignition gas is selected from a group consisting of air, nitrogen, and argon.

The invention further provides an apparatus for treating gaseous pollutant with plasma comprising: a microwave source generating a microwave oscillation; a waveguide component coupled to the microwave source to transmit the microwave oscillation; and a resonant cavity coupled to the waveguide component such that the microwave oscillation is substantially transmitted in the resonant cavity along a waveguide direction, the resonant cavity comprising a first chamber in proximity to the waveguide component and a second chamber distant from the waveguide component, the first chamber comprising an inlet end connected to the waveguide component and an outlet end distant from the waveguide component, the second chamber comprising a communicating end communicated with the outlet end and a closed end distant from the communicating end, the second chamber be configured to receive the microwave oscillation passing through the first chamber, the microwave oscillation interacting with an ignition gas in the second chamber to form a torch; wherein, the waveguide direction is substantially parallel to a reference axis defined in the first chamber, the first chamber comprises a first inner side wall, a second inner side wall opposite to the first inner side wall, a first top wall, and a first bottom wall, the first inner side wall and the second inner side wall incline inwardly toward the reference axis from the inlet end to the outlet end.

In one embodiment, a gradual width difference between the first inner side wall and the second inner side wall is decreasing.

In one embodiment, the second chamber has a second top wall and a second bottom wall, and there is a first difference in height between the second top wall and the first top wall of the first chamber.

In one embodiment, the second chamber has a second top wall and a second bottom wall, and there is a second difference in height between the second bottom wall and the first bottom wall of the first chamber.

In one embodiment, further comprising an ignition source and a dielectric tube, the dielectric tube is inserted in the second chamber and has a first end in proximity to the ignition source and a second end distant from the ignition source, the second chamber has a second top wall and a second bottom wall, the second end of the dielectric tube protrudes from the second chamber and there is a third difference in height between the second end of the dielectric tube and the second bottom wall of the second chamber.

In one embodiment, further comprising an ignition source and a dielectric tube, the dielectric tube is inserted in the second chamber, the ignition source comprises a probe component, and the probe component comprises a support member and at least one tip disposed on the support member, and the tip having an outer diameter between 1.6 mm and 2 mm.

The invention further provides an apparatus for treating gaseous pollutant without requiring fuel comprising: a microwave source generating a microwave oscillation; a waveguide component coupled to the microwave source to transmit the microwave oscillation; and a resonant cavity coupled to the waveguide component and extending along a waveguide direction, the resonant cavity comprising a tapered chamber in proximity to the waveguide component and a combustion chamber distant from the waveguide component, the combustion chamber be configured to receive the microwave oscillation passing through the tapered chamber, and the microwave oscillation interacting with a non-fuel ignition gas in the combustion chamber to form a torch.

In one embodiment, an inner wall of the tapered chamber has a first top wall and a first bottom wall, the combustion chamber has a second top wall and a second bottom wall, and there is a first difference in height between the second top wall and a bottom end of the first top wall.

In one embodiment, the inner wall of the tapered chamber has a first top wall and a first bottom wall, the combustion chamber has a second top wall and a second bottom wall, and there is a second difference in height between the second bottom wall and the first bottom wall.

In one embodiment, further comprising an ignition source and a dielectric tube, the dielectric tube is inserted in the combustion chamber and has a first end close to the ignition source and a second end distant from the ignition source, the combustion chamber has a second top wall and a second bottom wall, the second end of the dielectric tube protrudes from the combustion chamber and there is a third difference in height between the second end of the dielectric tube and the combustion chamber.

The invention utilizes a special chamber structure design to increase the tapered surface of the first chamber, for example, to achieve a space similar to a double-tapered chamber, thereby increasing the microwave field intensity so that the microwave field intensity of the second chamber is maximized. In this way, electric power required by the microwave source can be greatly reduced, and fuel gas is not required. In addition to reducing costs, it also achieves an object of saving energy. In addition, the ignition source of the invention only needs the probe, and does not need to be equipped with an ignition transformer and a glow discharge electrode as in the conventional technology, and does not need an ignition transformer to supply electric power to the glow discharge electrode.

In one aspect, the apparatus for treating gaseous pollutant with plasma of the invention can be directly used as an exhaust gas treatment apparatus; alternatively, the apparatus for treating gaseous pollutant with plasma of the invention can also be used as a exhaust gas treatment module to be integrated with other forms of exhaust gas treatment apparatuses.

DETAILED DESCRIPTION OF THE PREFERRED EMBODIMENTS

The invention discloses an apparatus for treating gaseous pollutant with plasma. Referring to FIG. 1, FIG. 2, FIG. 3A, FIG. 3B, FIG. 4A and FIG. 4B. In one embodiment, the apparatus comprises a microwave source 10, a waveguide component 20, a separator 30, a resonant cavity 40, a dielectric tube 50, a probe component 60, a moving member 70, a cooling assembly 80, and a dielectric window assembly 90. The microwave source 10 is used to generate a microwave oscillation. In this embodiment, the microwave source 10 may be a magnetron. The waveguide component 20 is in proximity to the microwave source 10 and is coupled to the microwave source 10. The waveguide component 20 comprises a cavity 21, which is in a cuboid shape and comprises an inlet end 21a and an outlet end 21b. The inlet end 21a is connected to the microwave source 10. The separator 30 is disposed between the waveguide component 20 and the resonant cavity 40. The dielectric window assembly 90 comprises at least one first dielectric window 90a and at least one second dielectric window 90b. The first dielectric window 90a is disposed between the waveguide component 20 and the separator 30, and the second dielectric window 90b is disposed between the separator 30 and the resonant cavity 40. In this embodiment, the separator 30 comprises a circulator and a water load, and the first dielectric window 90a and the second dielectric window 90b are made of a quartz glass.

Figure 1:
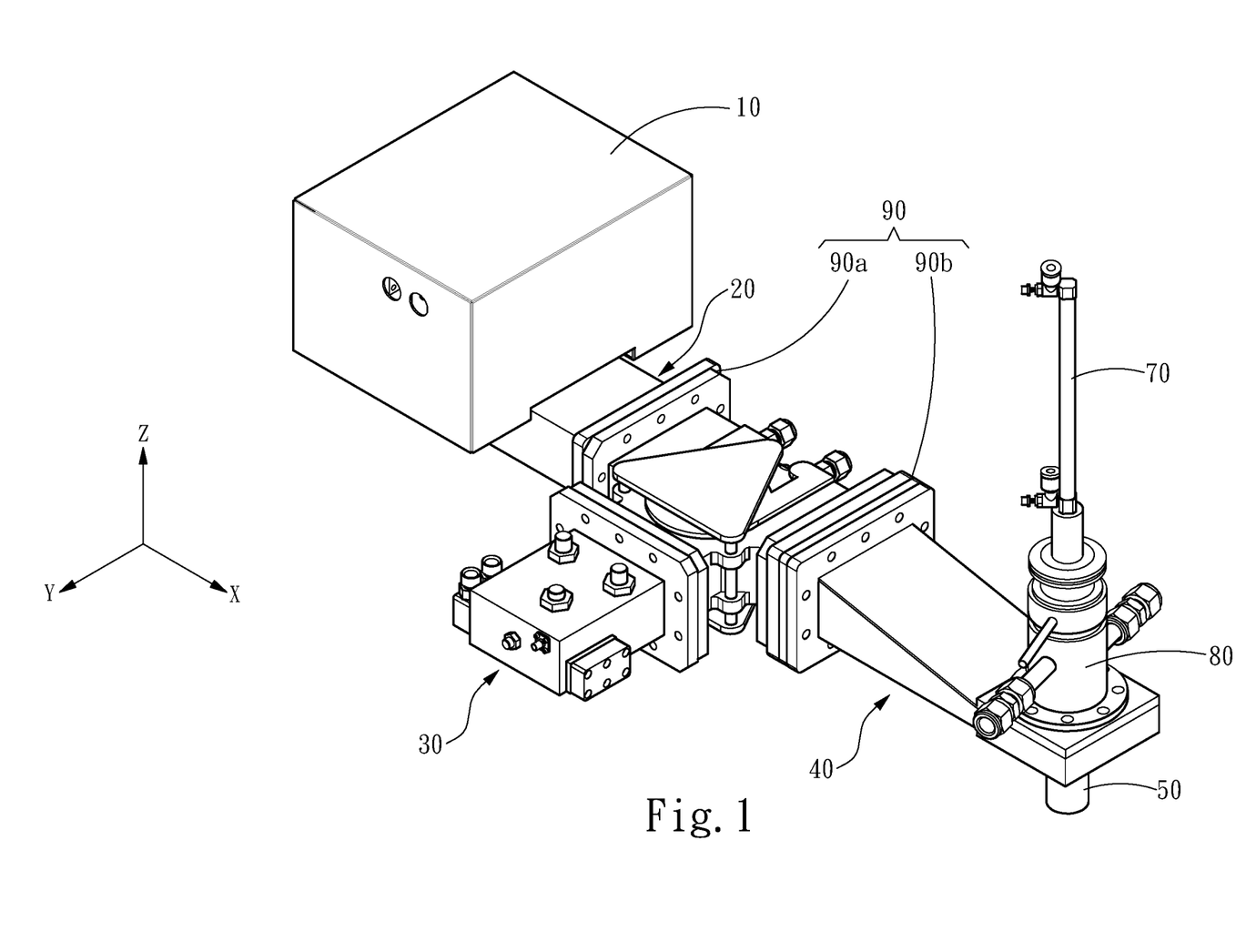
FIG. 1 is a perspective assembly view of one embodiment of the invention.
Figure 2:
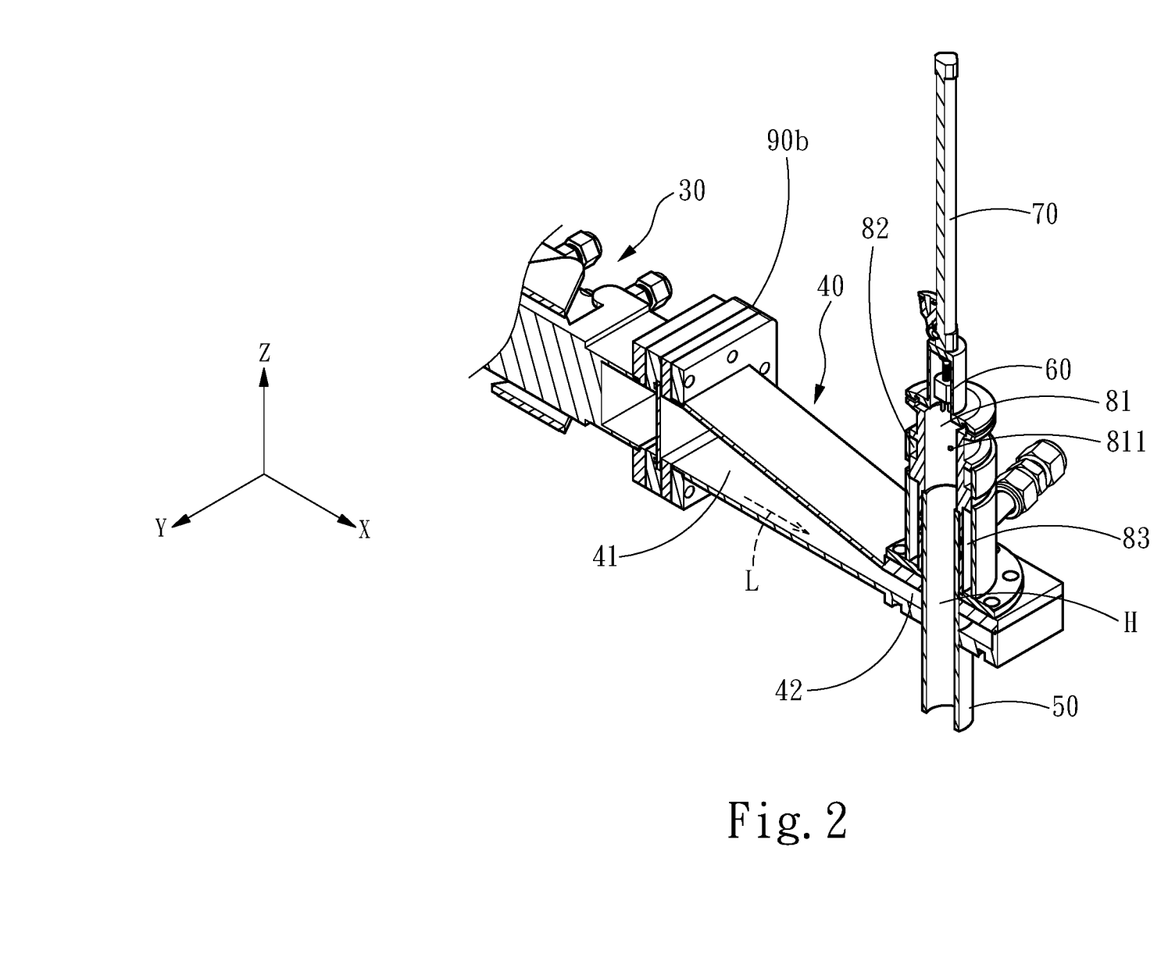
FIG. 2 is a partial cross-section perspective view of FIG. 1 along the XZ plane.
Figure 3A:
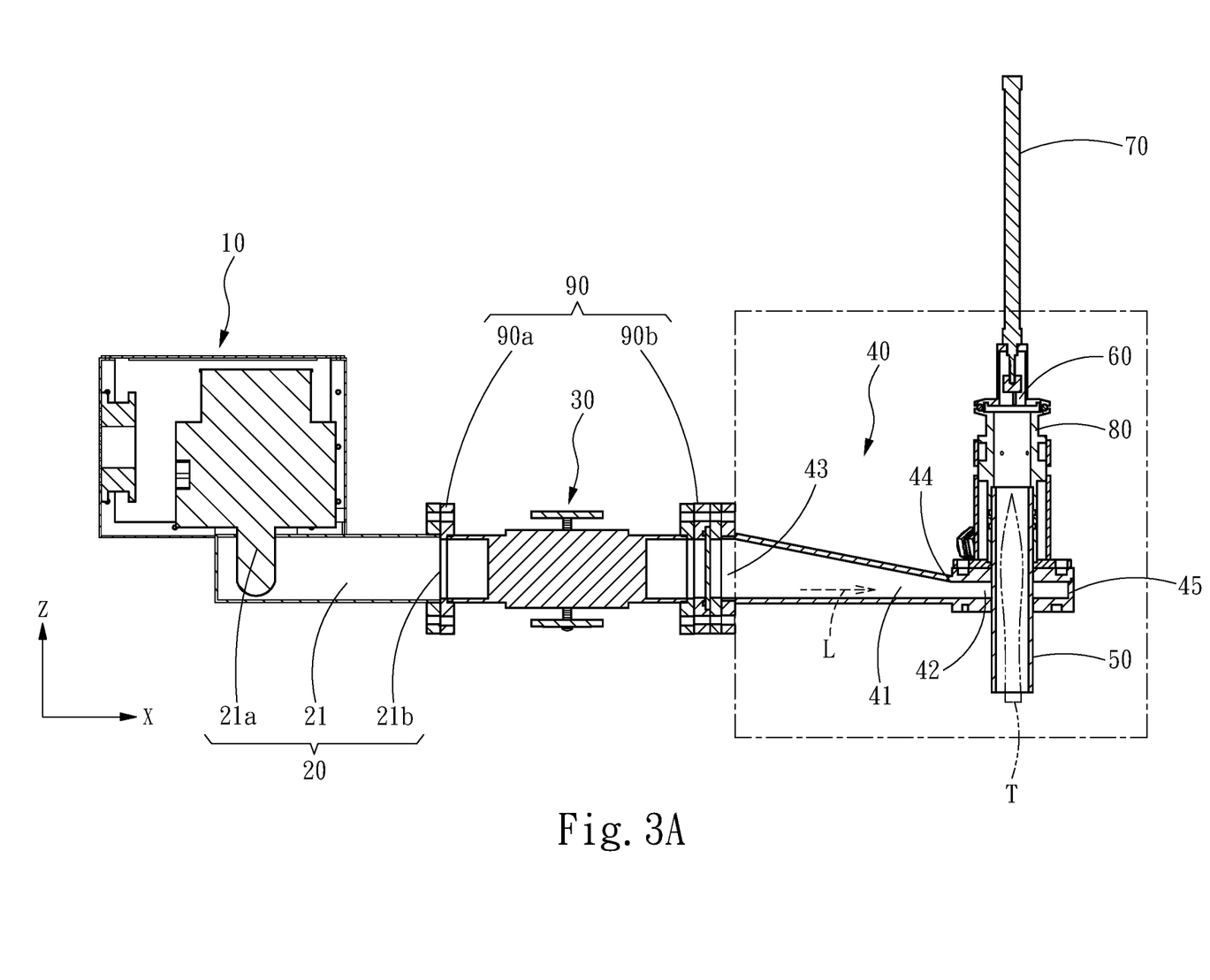
FIG. 3A is a cross-section view of FIG. 1 along the XZ plane.
Figure 3B:
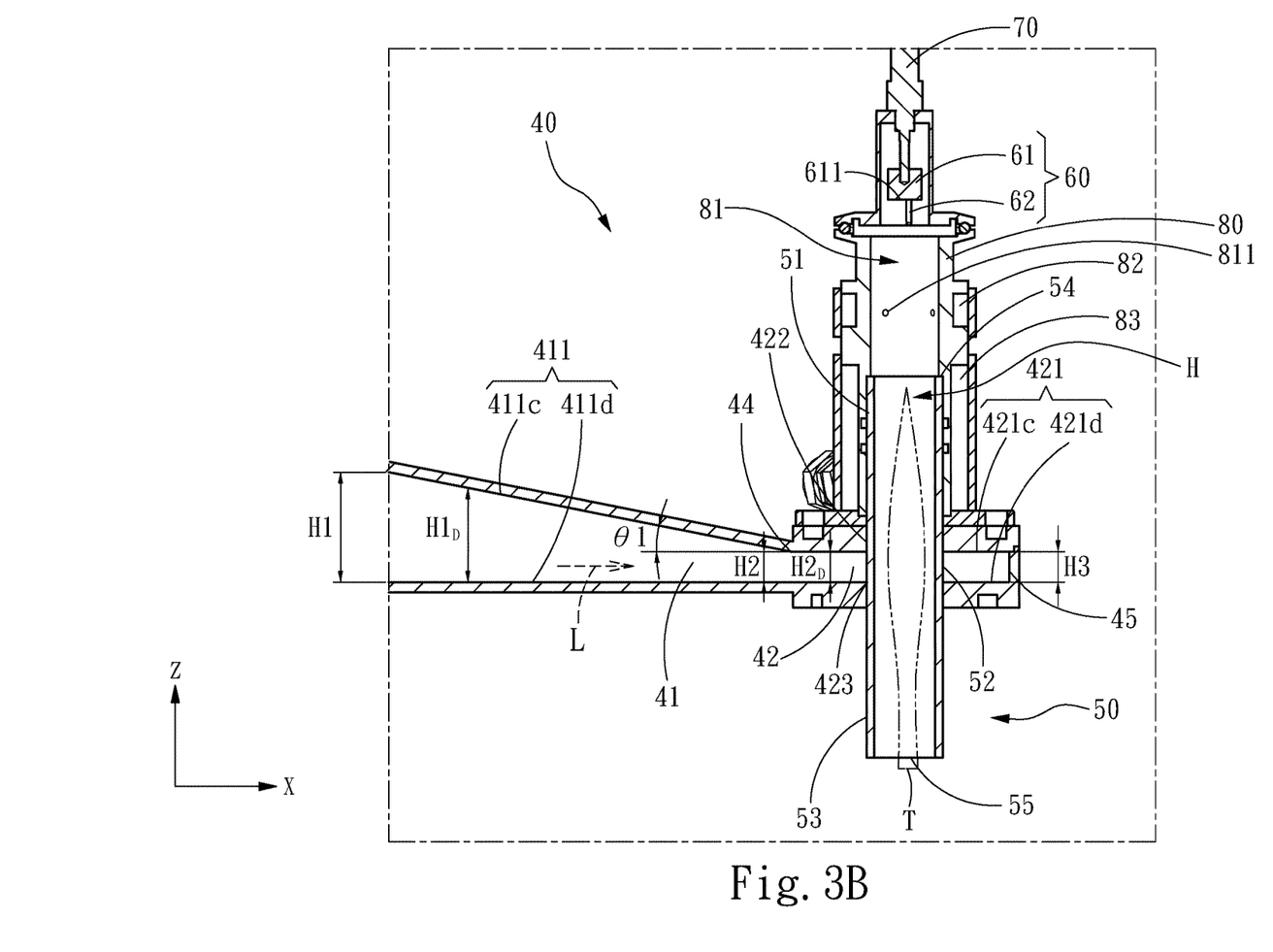
FIG. 3B is a partially enlarged cross-section view of FIG. 3A.

Referring to FIG. 2, FIG. 3A and FIG. 3B, the resonant cavity 40 comprises a first chamber 41, a second chamber 42, an inlet end 43, a communicating end 44, and a closed end 45. In one embodiment of the invention, the first chamber 41 extends along a reference axis L, the microwave oscillation is propagated in the resonant cavity 40 substantially parallel to a waveguide direction, and the waveguide direction is substantially parallel to the reference axis L. The first chamber 41 has an inner wall 411 extended around and along the reference axis L, which comprises a first region and a second region, wherein the first region is inclined to the reference axis L, and the second region is substantially parallel in respect to the reference axis L. An area of the first region is larger than that of the second region, so that the first chamber 41 forms a tapered shaped space which becomes narrower from the inlet end 43 to the communicating end 44. In another embodiment of the invention, the resonant cavity 40 is coupled to the waveguide component 20 and extends along the waveguide direction. The resonant cavity 40 comprises a tapered chamber in proximity to the waveguide component 20 and a combustion chamber distant from the waveguide component 20, the combustion chamber is configured to receive the microwave oscillation passing through the tapered chamber, and the microwave oscillation interacts with a non-fuel ignition gas in the combustion chamber to form a torch T.

Figure 4A:
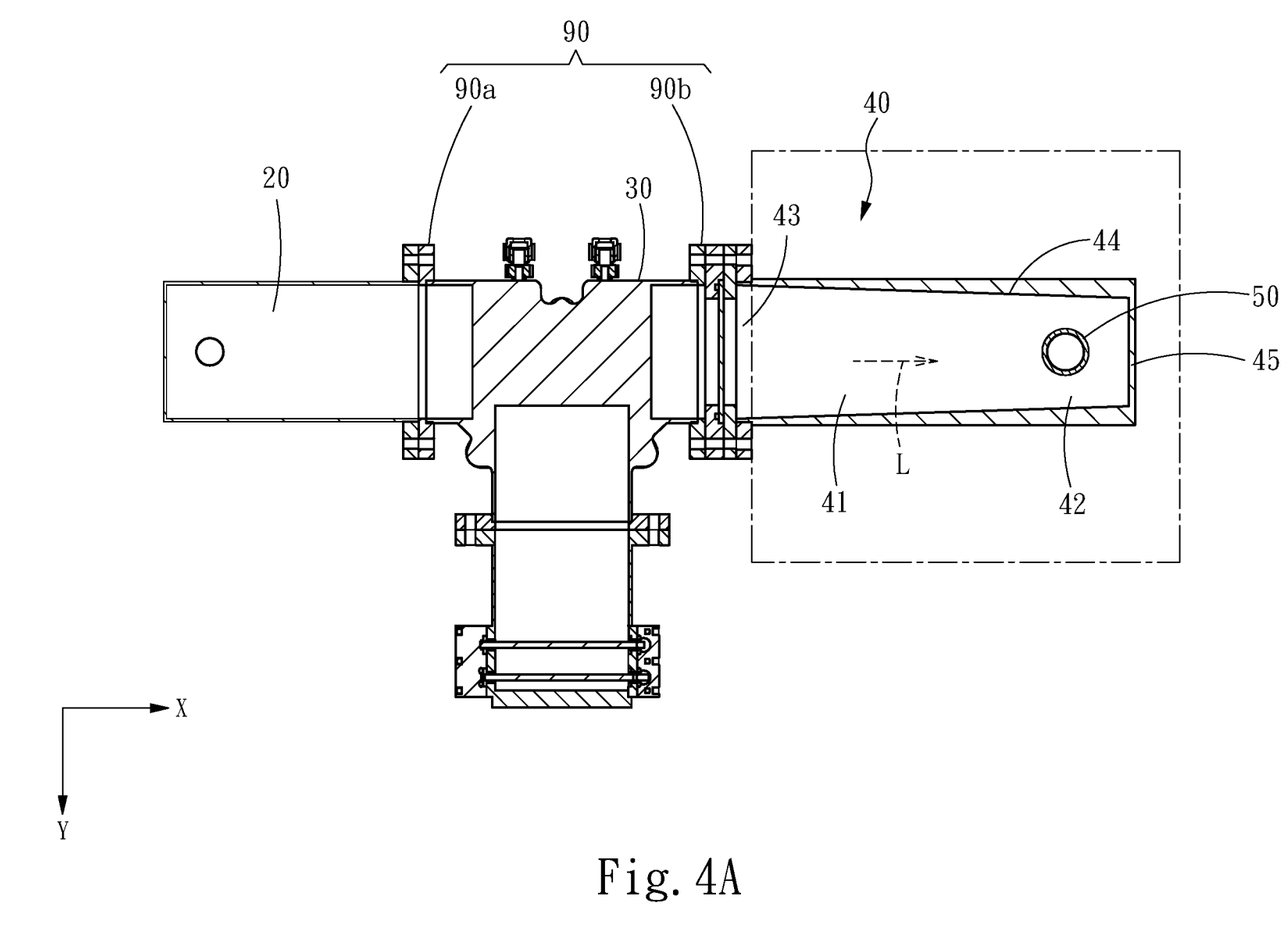
FIG. 4A is a cross-section view of FIG. 1 along the XY plane.
Figure 4B:
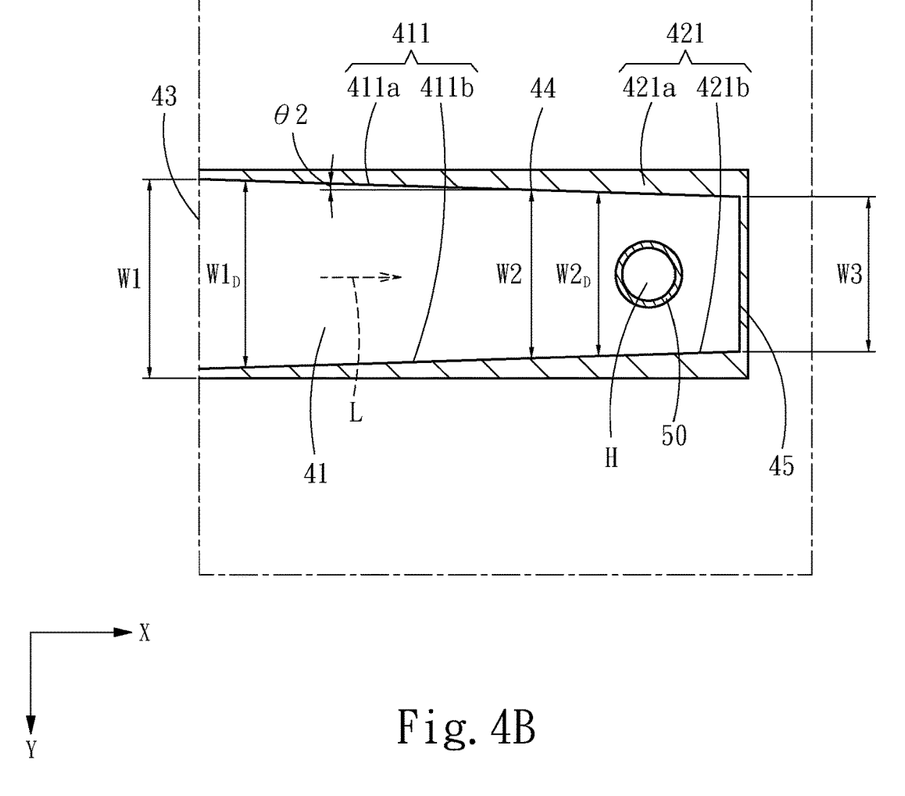
FIG. 4B is a partially enlarged cross-section view of FIG. 4A.

Referring to FIG. 3A, FIG. 3B, FIG. 4A and FIG. 4B, in this embodiment, the inner wall 411 comprises a first inner side wall 411a, a second inner side wall 411b, a first top wall 411c, and a first bottom wall 411d. The first inner side wall 411a and the second inner side wall 411b are symmetrically inclined inwardly relative to the reference axis L, and an included angle θ2 between the first inner side wall 411a or the second inner side wall 411b and the reference axis L is from 1° to 5°, preferably the included angle θ2 is from 1° to 3°. The first top wall 411c is inclined inwardly relative to the reference axis L, and an included angle θ1 between the first top wall 411c and the reference axis L is from 10° to 15°, preferably the included angle θ1 is from 10° to 13°. The first top wall 411c comprises a first end close to the inlet end 43 and a second end close to the communicating end 44, the first end is higher than the second end. The first bottom wall 411d is substantially parallel in respect to the reference axis L. In other words, in this embodiment, the first region comprises the first inner side wall 411a, the second inner side wall 411b and the first top wall 411c, and the second region comprises the first bottom wall 411d. In this embodiment, an area ratio of the first region to the second region is between 1.2 and 2. As shown in FIG. 4B, a difference in width W1D between the first inner side wall 411a and the second inner side wall 411b is gradually decreasing along the reference axis L; as shown in FIG. 3B, a difference in height H1D between the first top wall 411c and the first bottom wall 411d is gradually decreasing along the reference axis L.

Referring to FIG. 3A, FIG. 3B, FIG. 4A and FIG. 4B, in this embodiment, the second chamber 42 comprises a first inner side wall 421a, a second inner side wall 421b, a second top wall 421c, and a second bottom wall 421d. The second top wall 421c comprises an upper opening 422, the second bottom wall 421d comprises a lower opening 423, and the dielectric tube 50 is inserted through the upper opening 422 and the lower opening 423. The dielectric tube 50 comprises a first section part 51, a second section part 52, a third section part 53, a top end 54, and a bottom end 55. The first section part 51 and the third section part 53 are respectively protruded out from the upper opening 422 and the lower opening 423, and the second section part 52 is located in the second chamber 42. In this embodiment, the first inner side wall 421a of the second chamber 42 and the first inner side wall 411a of the first chamber 41 share a same slope so as to form a continuous inclined surface relative to the reference axis L; the second inner side wall 421b of the second chamber 42 and the second inner side wall 411b of the first chamber 41 also share a same slope so as to form a continuous inclined surface relative to the reference axis L; the second top wall 421c and the second bottom wall 421d of the second chamber 42 are parallel to each other. In one embodiment, the second bottom wall 421d of the second chamber 42 and the first bottom wall 411d of the first chamber 41 are located at a same height (or on a same horizon); the second top wall 421c of the second chamber 42 and a lowest end of the first top wall 411c of the first chamber 41 are located at a same height (or on a same horizon). A difference in height $H2_D$ is provided between the second top wall 421c and the second bottom wall 421d of the second chamber 42. In this embodiment, the difference in height $H2_D$ is a constant value along the reference axis L, and in other embodiments, the difference in height $H2_D$ may be a gradually changing value along the reference axis L or a variable varying along the reference axis L.

In the resonant cavity 40, the inlet end 43 has a first height H1 and a first width W1, the communicating end 44 has a second height H2 and a second width W2, and the closed end 45 has a third height H3 and a third width W3. In this embodiment, the first height H1 and the first width W1 of the inlet end 43 are respectively greater than the second height H2 and the second width W2 of the communicating end 44; the second height H2 of the communicating end 44 is equal to the third height H3 of the closed end 45; the second width W2 of the communicating end 44 is greater than the third width W3 of the closed end 45; and in other embodiments, the second width W2 of the communicating end 44 can also be equal to the third width W3 of the closed end 45.

Referring to FIG. 2 and FIG. 3B, the cooling assembly 80 is installed on a side of the top end 54 of the dielectric tube 50 and covers the first section part 51 of the dielectric tube 50, the moving member 70 is connected to the probe component 60 and installed on the cooling assembly 80. The probe component 60 comprises a support member 61 and at least one tip 62 disposed on an end face 611 of the support member 61. The moving member 70 controls a vertical movement of the probe component 60 relative to the second chamber 42. The cooling assembly 80 comprises a gas chamber 81, a gas pipeline 82, and a cooling pipeline 83. The gas chamber 81 communicates with a hollow part H of the dielectric tube 50, an inner wall of the gas chamber 81 has at least one gas hole 811, and at least one ignition gas enters the gas chamber 81 from the at least one gas hole 811 and enters the hollow part H of the dielectric tube 50. In one embodiment, the ignition gas is a non-fuel gas. In an example, the non-fuel gas is at least one type of inert gas, such as nitrogen ($N_2$), argon (Ar) or clean dry air/compressed dry air (CDA). The cooling pipeline 83 is used for cooling fluid flow, so as to control a temperature of the gas chamber 81 to avoid overheating and component damage. In this embodiment, the probe component 60, the moving member 70 and the cooling assembly 80 constitute an ignition source. However, this is only an example for illustration, according to actual applications, the ignition source can also have other configurations.

Referring to FIG. 3B, a maximum intensity of the microwave oscillation is generated in the second chamber 42 of the resonant cavity 40, and the maximum intensity will be occurred inside the hollow part H in the second section part 52 of the dielectric tube 50. When the ignition gas is filled into the hollow part H of the dielectric tube 50, the moving member 70 controls the probe component 60 to enter the hollow part H in the second section part 52 downwardly, and when the maximum intensity of the microwave oscillation reaches a threshold value, the tip 62 of the probe component 60 generates the torch T. In this embodiment, the moving member 70 can be a cylinder.

Figure 5:
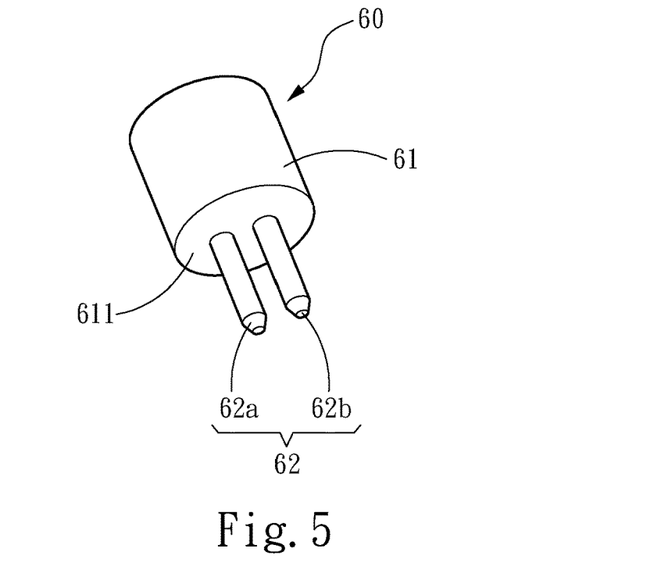
FIG. 5 is a perspective assembly view of a probe component in one embodiment of the invention.

Referring to FIG. 5, in one embodiment of the invention, the probe component 60 comprises a first tip 62a and a second tip 62b, the first tip 62a and the second tip 62b respectively comprise a tapered end portion, a diameter of tapered end portion is between 1.6 mm and 2.0 mm, lengths of the first tip 62a and the second tip 62b are respectively between 30 mm and 50 mm, materials of the first tip 62a and the second tip 62b can be copper (Cu), tungsten (W) or nickel-chromium alloy, such as Inconel® 600. By providing a plurality of the tips, a probability of generating spark can be increased. In addition, in other embodiments, the end portion can have a diameter of less than 1.6 mm.

According to one embodiment of the invention, there is a first difference in height between the first top wall 411c of the first chamber 41 and the second top wall 421c of the second chamber 42; according to another embodiment of the invention, there is a second difference in height between the first bottom wall 411d of the first chamber 41 and the second bottom wall 421d of the second chamber 42. The bottom end 55 of the dielectric tube 50 is protruded out from the second chamber 42 and there is a third difference in height between the bottom end 55 of the dielectric tube 50 and the second bottom wall 421d of the second chamber 42.

Figure 6A:
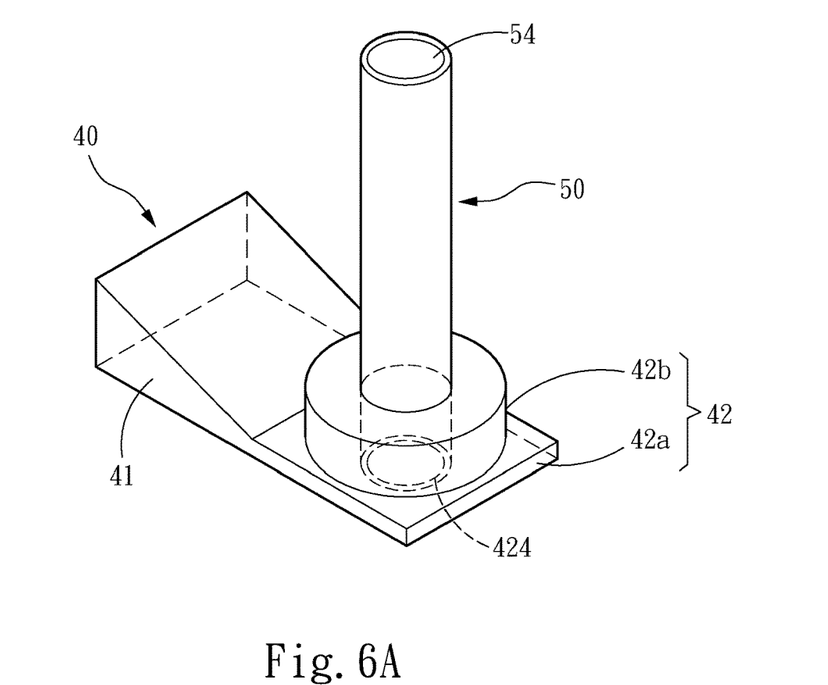
FIG. 6A is a partial perspective assembly view of a first embodiment of the invention.
Figure 6B:
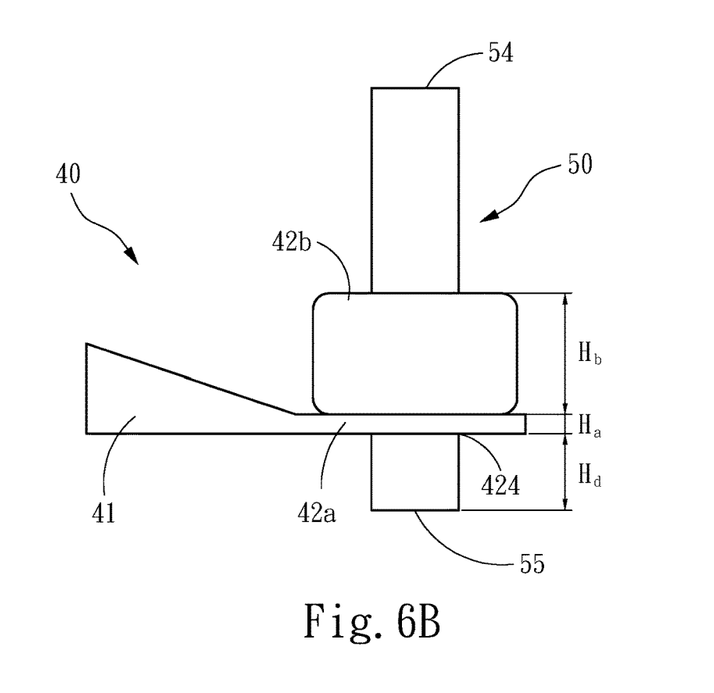
FIG. 6B is a side view of FIG. 6A.

Referring to FIG. 6A, FIG. 6B, FIG. 7A, FIG. 7B, FIG. 8A, FIG. 8B and FIG. 9, according to different embodiments of the invention, by changing and adjusting the first difference in height, the second difference in height, and the third difference in height, as well as dimensions of the section parts of the dielectric tube 50, an intensity of the microwave field can be further adjusted or increased. FIG. 6A and FIG. 6B respectively show a partial perspective assembly view and a side view of FIG. 6A of a first embodiment of the invention. In this embodiment, the second chamber 42 comprises a first body 42a and a second body 42b. Heights of the first body 42a and the second body 42b are respectively denoted as $H_a$ and $H_b$, respectively. A distance between the bottom end 55 of the dielectric tube 50 and an outer bottom wall of the first body 42a of the second chamber 42 is denoted as $H_d$. The first body 42a is in a cuboid shape, and the second body 42b is in a cylinder shape. The height $H_a$ of the first body 42a is 20 mm, a diameter of the second body 42b is 80 mm, a diameter of an opening 424 of the first body 42a is 36 mm, and a total length of the dielectric tube 50 is 20 cm. Table 1 below shows measurements of the maximum field intensity (V/m) in the second chamber 42 according to the different heights $H_b$ of the second body 42b and the different distances $H_d$.

TABLE 1

| $H_b$ (mm) | $H_d$ (mm) | Maximum field intensity (V/m) |
|---|---|---|
| 100 | 35 | 342040 |
| 50 | 5 | 536790 |
| 75 | 60 | 643740 |
| 25 | 60 | 397650 |
| 60 | 35 | 659930 |
| 65 | 50 | 562390 |
| 70 | 55 | 472280 |
| 80 | 35 | 495810 |

Figure 7A:
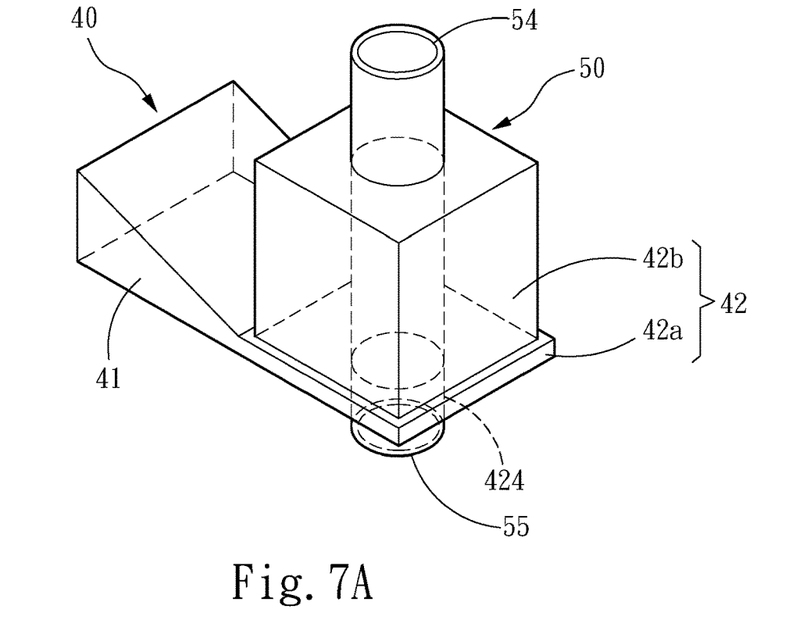
FIG. 7A is a partial perspective assembly view of a second embodiment of the invention.
Figure 7B:
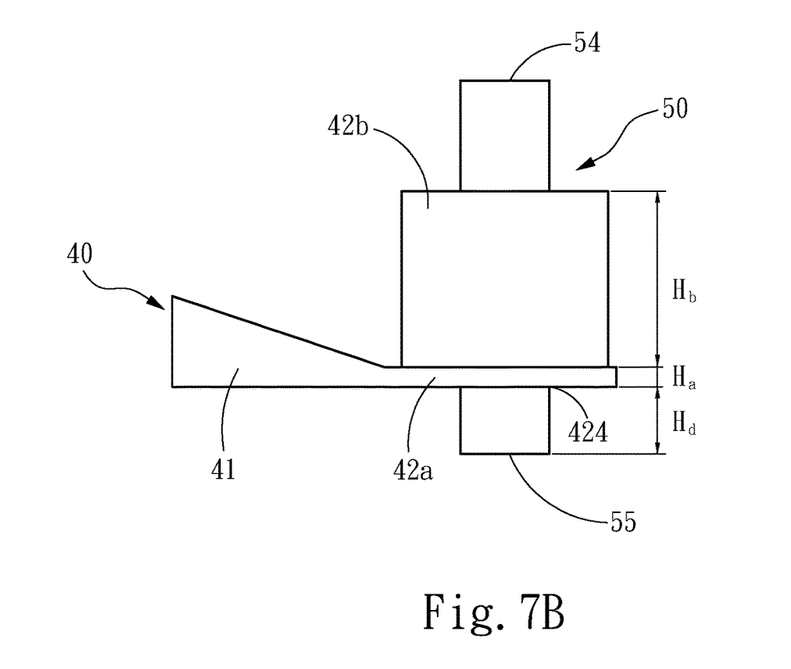
FIG. 7B is a side view of FIG. 7A.

Referring to FIG. 7A and FIG. 7B respectively for a partial perspective assembly view and a side view of FIG. 7B of a second embodiment of the invention. In this embodiment, the second chamber 42 comprises the first body 42a and the second body 42b. Heights of the first body 42a and the second body 42b are respectively denoted as $H_a$ and $H_b$. A distance between the bottom end 55 of the dielectric tube 50 and the outer bottom wall of the first body 42a of the second chamber 42 is denoted as $H_d$, both the first body 42a and the second body 42b are cuboids. The height $H_a$ of the first body 42a is 20 mm, a side length of the second body 42b is 80 mm, a diameter of the opening 424 of the first body 42a is 36 mm, and a total length of the dielectric tube 50 is 20 cm. Table 2 below shows measurements of the maximum field intensity (V/m) in the second chamber 42 according to the different heights $H_b$ of the second body 42b and the different distances $H_d$.

TABLE 2

| $H_b$ (mm) | $H_d$ (mm) | Maximum field intensity (V/m) |
|---|---|---|
| 100 | 35 | 366710 |
| 50 | 5 | 746580 |
| 75 | 60 | 608990 |
| 25 | 70 | 386360 |
| 60 | 35 | 672790 |
| 65 | 70 | 555980 |
| 45 | 50 | 751930 |
| 55 | 80 | 507490 |
| 40 | 95 | 871530 |

Figure 8A:
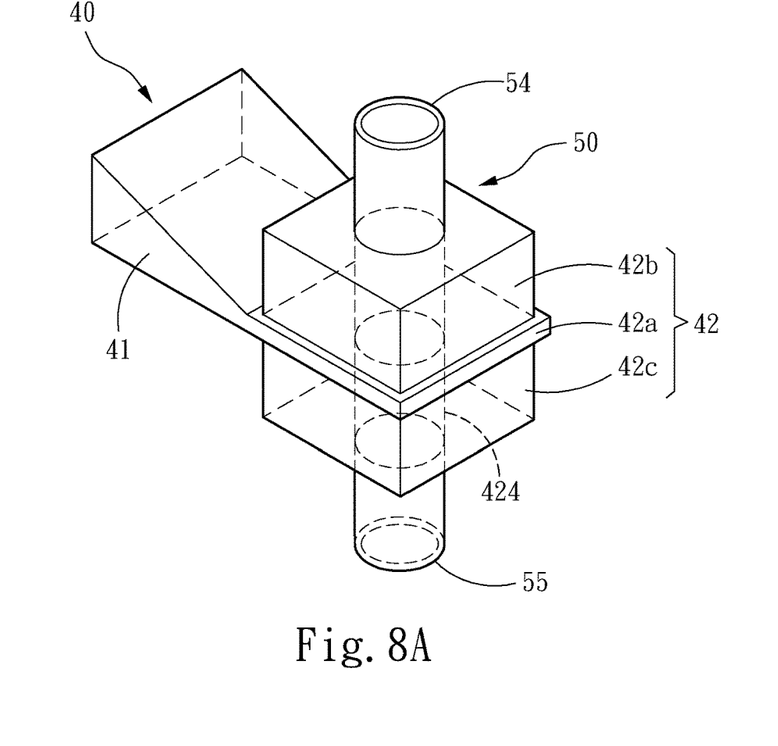
FIG. 8A is a partial perspective assembly view of a third embodiment of the invention.
Figure 8B:
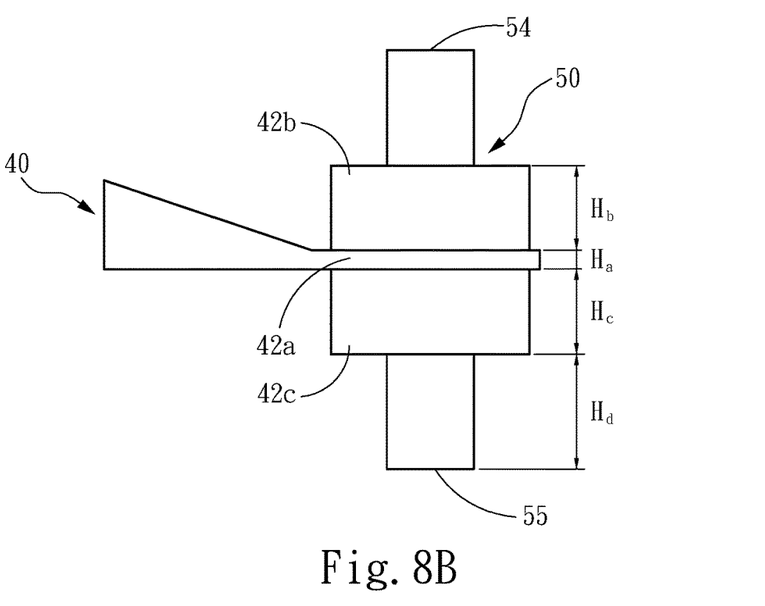
FIG. 8B is a side view of FIG. 8A.

Referring to FIG. 8A and FIG. 8B respectively for a partial perspective assembly view and a side view of FIG. 8A of a third embodiment of the invention. In this embodiment, the second chamber 42 comprises the first body 42a, the second body 42b, and a third body 42c. Heights of the first body 42a, the second body 42b and the third body 42c are respectively denoted as $H_a$, $H_b$ and $H_c$. A distance between the bottom end 55 of the dielectric tube 50 and an outer bottom wall of the third body 42c of the second chamber 42 is denoted as $H_d$, the first body 42a, the second body 42b and the third body 42c are all cuboids. The height $H_a$ of the first body 42a is 20 mm, side lengths of the first body 42a and the third body 42c are 80 mm, a diameter of the opening 424 of the first body 42a is 36 mm, and a total length of the dielectric tube 50 is 20 cm. Table 3 and Table 4 below show measurements of the maximum field intensity (V/m) in the second chamber 42 according to the different heights $H_b$ of the second body 42b, the different heights $H_c$ of the third body 42c and the different distances $H_d$.

TABLE 3

| $H_b$ (mm) | $H_c$ (mm) | $H_d$ (mm) | Maximum field intensity (V/m) |
|---|---|---|---|
| 75 | 75 | 105 | 120380 |
| 40 | 40 | 60 | 474520 |
| 20 | 20 | 35 | 1528900 |
| 60 | 60 | 115 | 461070 |
| 30 | 30 | 45 | 709300 |
| 50 | 50 | 125 | 220540 |
| 10 | 10 | 55 | 569970 |
| 15 | 15 | 70 | 488460 |
| 25 | 25 | 160 | 215230 |

TABLE 4

| $H_b$ (mm) | $H_c$ (mm) | $H_d$ (mm) | Maximum field intensity (V/m) |
|---|---|---|---|
| 40 | 0 | 95 | 871530 |
| 35 | 5 | 100 | 1040100 |
| 30 | 10 | 25 | 827990 |
| 25 | 15 | 110 | 2387600 |
| 20 | 20 | 35 | 1528900 |
| 15 | 25 | 165 | 222230 |
| 10 | 30 | 125 | 426190 |
| 5 | 35 | 130 | 790510 |
| 0 | 40 | 175 | 3247600 |

Figure 9:
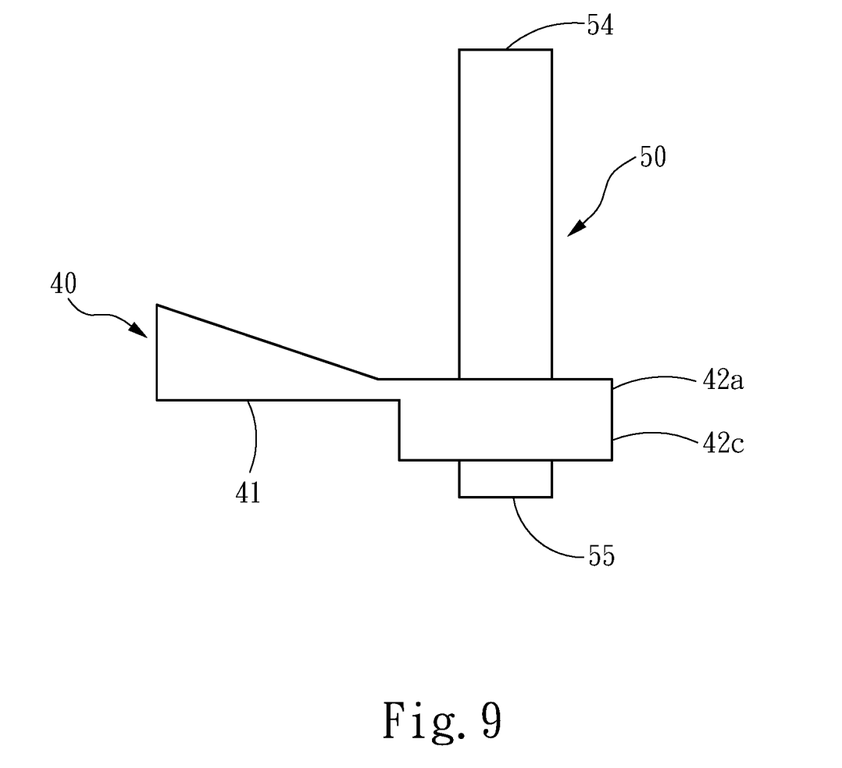
FIG. 9 is a partial schematic diagram of a fourth embodiment of the invention.

Among the above mentioned configurations, the example in Table 4 has the highest maximum field intensity. The structure of this configuration is shown in FIG. 9.

Figure 10:
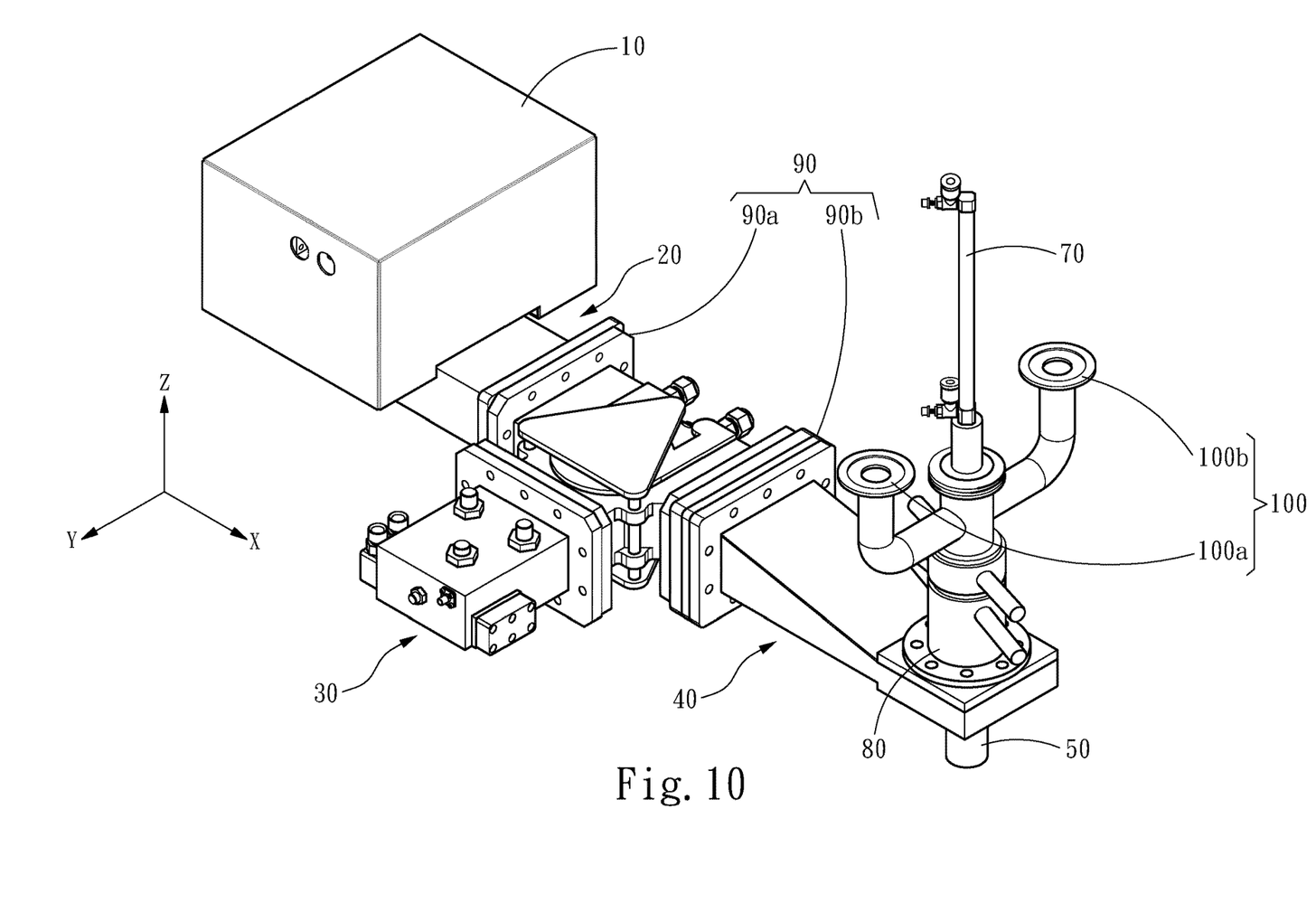
FIG. 10 is a perspective assembly view of another embodiment of the invention.
Figure 11:
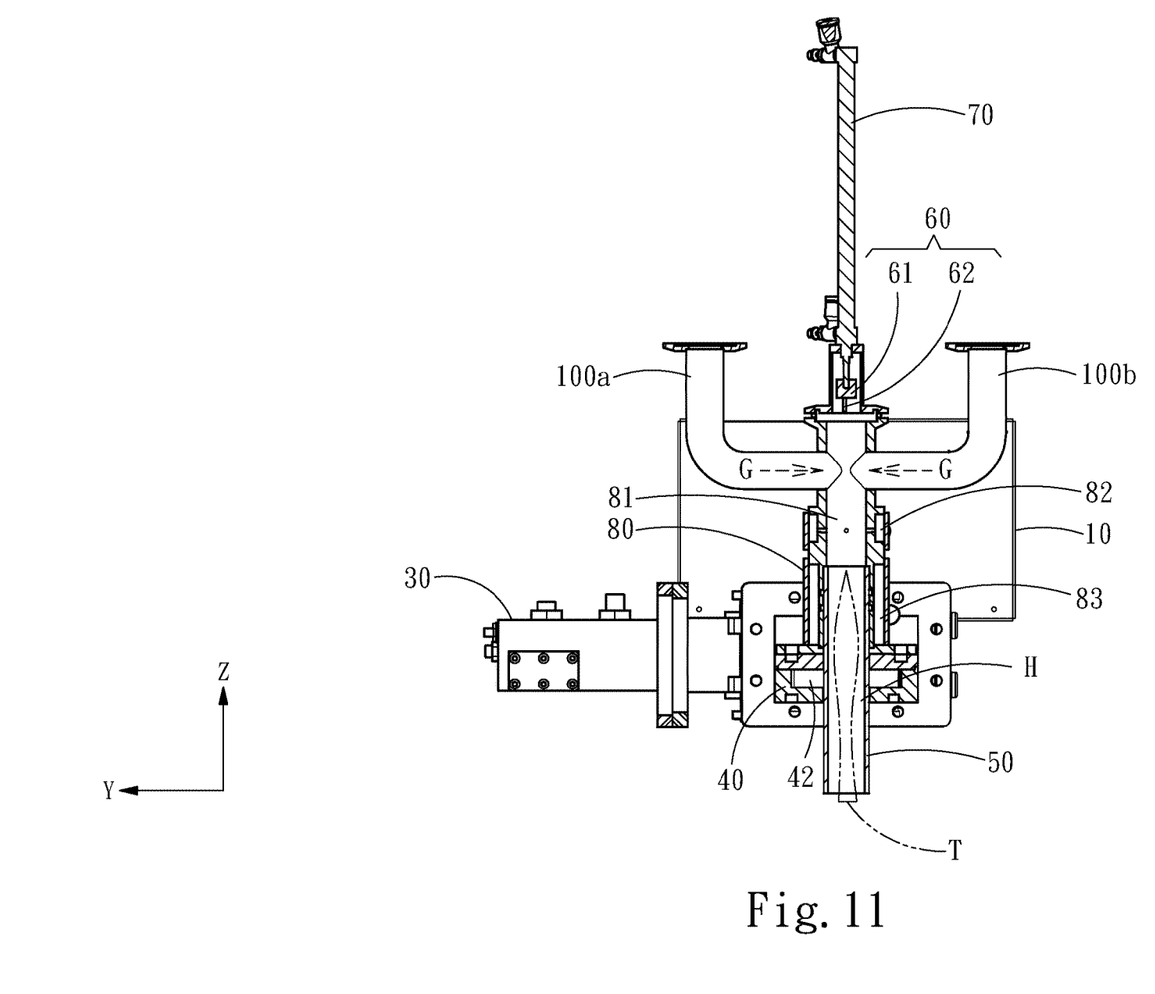
FIG. 11 is a cross-section view of FIG. 10 along the YZ plane.

Referring to FIG. 10 and FIG. 11 of the invention for a perspective assembly view, respectively, and a cross-section view of FIG. 10 along the YZ plane of another embodiment of the invention. In this embodiment, the apparatus for treating gaseous pollutant with plasma further comprises an air intake module 100. The air intake module 100 comprises a first pipeline 100a and a second pipeline 100b, the first pipeline 100a and the second pipeline 100b are installed in the cooling assembly 80 and communicate with the gas chamber 81. The air intake module 100 is used to introduce at least one gaseous pollutant G to be treated into the gas chamber 81, and the at least one gaseous pollutant G enters the hollow part H of the dielectric tube 50 through the gas chamber 81 and is decomposed by a high temperature formed by the torch T.

What is claimed is:

1. An apparatus for treating gaseous pollutant with plasma comprising:
    a microwave source configured to generate a microwave oscillation;
    a waveguide component coupled to the microwave source and configured to receive the microwave oscillation such that the microwave oscillation is propagated through the waveguide component; and
    a resonant cavity coupled to the waveguide component such that the microwave oscillation is substantially propagated in the resonant cavity along a waveguide direction, the resonant cavity comprising a first chamber in proximity to the waveguide component and a second chamber distant from the waveguide component, the first chamber comprising an inlet end connected to the waveguide component and an outlet end opposite to the waveguide component, the second chamber comprising a communicating end communicated with the outlet end and a closed end opposite to the communicating end, the second chamber being configured to receive the microwave oscillation passed through the first chamber, the microwave oscillation interacting with an ignition gas in the second chamber to generate a torch;
    wherein, the waveguide direction is substantially parallel to a reference axis defined in the first chamber, the first chamber comprises an inner wall around the reference axis and extending along the reference axis, the inner wall comprises a first region inclined to the reference axis and a second region substantially parallel in respect to the reference axis, an area of the first region is larger than that of the second region so that the first chamber comprises a tapered shaped space which becomes narrower from the inlet end to the outlet end.

2. The apparatus for treating gaseous pollutant with plasma according to claim 1, wherein the inner wall comprises a first inner side wall and a second inner side wall opposite to the first inner side wall, and the first inner side wall and the second inner side wall respectively obliquely incline inwardly toward the reference axis from the inlet end to the outlet end.

3. The apparatus for treating gaseous pollutant with plasma according to claim 1, wherein the inner wall comprises a first inner side wall and a second inner side wall opposite to the first inner side wall, and a width between the first inner side wall and the second inner side wall is gradually decreasing along the reference axis.

4. The apparatus for treating gaseous pollutant with plasma according to claim 1, wherein the inner wall of the first chamber comprises a first top wall and a first bottom wall, the second chamber comprises a second top wall and a second bottom wall, and a first difference in height is provided between the second top wall and the first top wall.

5. The apparatus for treating gaseous pollutant with plasma according to claim 1, wherein the inner wall of the first chamber comprises a first top wall and a first bottom wall, the second chamber comprises a second top wall and a second bottom wall, and a second difference in height is provided between the second bottom wall and the first bottom wall.

6. The apparatus for treating gaseous pollutant with plasma according to claim 1, further comprising an ignition source and a dielectric tube, wherein the dielectric tube is inserted in the second chamber and comprises a first end close to the ignition source and a second end distant from the ignition source, the second chamber comprises a second top wall and a second bottom wall, the second end of the dielectric tube protrudes out from the second chamber and a third difference in height is provided between the second end of the dielectric tube and the second bottom wall of the second chamber.

7. The apparatus for treating gaseous pollutant with plasma according to claim 1, further comprising an ignition source and a dielectric tube, wherein the dielectric tube is inserted in the second chamber, the ignition source comprises a probe component, the probe component comprises a support member and at least one tip disposed on the support member, and the tip having an outer diameter between 1.6 mm and 2 mm.

8. The apparatus for treating gaseous pollutant with plasma according to claim 1, wherein the ignition gas is selected from a group consisting of air, nitrogen, and argon.

9. An apparatus for treating gaseous pollutant with plasma comprising:
    a microwave source configured to generate a microwave oscillation;
    a waveguide component coupled to the microwave source and configured to receive the microwave oscillation such that the microwave oscillation is propagated through the waveguide component; and a resonant cavity coupled to the waveguide component such that the microwave oscillation is substantially propagated in the resonant cavity along a waveguide direction, the resonant cavity comprising a first chamber in proximity to the waveguide component and a second chamber distant from the waveguide component, the first chamber comprising an inlet end connected to the waveguide component and an outlet end opposite to the waveguide component, the second chamber comprising a communicating end communicated with the outlet end and a closed end opposite to the communicating end, the second chamber being configured to receive the microwave oscillation passed through the first chamber, the microwave oscillation interacting with an ignition gas in the second chamber to generate a torch;

wherein, the waveguide direction is substantially parallel to a reference axis defined in the first chamber, the first chamber comprises a first inner side wall, a second inner side wall opposite to the first inner side wall, a first top wall, and a first bottom wall, the first inner side wall and the second inner side wall obliquely incline inwardly toward the reference axis from the inlet end to the outlet end.

10. The apparatus for treating gaseous pollutant with plasma according to claim 9, wherein a width between the first inner side wall and the second inner side wall is gradually decreasing along the reference axis.

11. The apparatus for treating gaseous pollutant with plasma according to claim 9, wherein the second chamber comprises a second top wall and a second bottom wall, and a first difference in height is provided between the second top wall and the first top wall of the first chamber.

12. The apparatus for treating gaseous pollutant with plasma according to claim 9, wherein the second chamber comprises a second top wall and a second bottom wall, and a second difference in height is provided between the second bottom wall and the first bottom wall of the first chamber.

13. The apparatus for treating gaseous pollutant with plasma according to claim 9, further comprising an ignition source and a dielectric tube, wherein the dielectric tube is inserted in the second chamber and comprises a first end in proximity to the ignition source and a second end distant from the ignition source, the second chamber comprises a second top wall and a second bottom wall, the second end of the dielectric tube protrudes out from the second chamber and a third difference in height is provided between the second end of the dielectric tube and the second bottom wall of the second chamber.

14. The apparatus for treating gaseous pollutant with plasma according to claim 9, further comprising an ignition source and a dielectric tube, wherein the dielectric tube is inserted in the second chamber, the ignition source comprises a probe component, the probe component comprises a support member and at least one tip disposed on the support member, and the tip having an outer diameter between 1.6 mm and 2 mm.

* * * * *